US009923865B1

(12) United States Patent
Wei et al.

(10) Patent No.: US 9,923,865 B1
(45) Date of Patent: Mar. 20, 2018

(54) NETWORK ADDRESS MANAGEMENT (71) Applicant: Amazon Technologies, Inc., Seattle, WA (US)

(72) Inventors: Eric Paul Wei, Seattle, WA (US); Mihir Sadruddin Surani, Seattle, WA (US); Diwakar Gupta, Seattle, WA (US); Rudresh Amin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 14/624,809

(22) Filed: Feb. 18, 2015

(51) Int. Cl.
*G06F 15/16* (2006.01)
*H04L 29/12* (2006.01)

(52) U.S. Cl.
CPC .................. *H04L 61/2076* (2013.01)

(58) Field of Classification Search
None
See application file for complete search history.

(56) References Cited

U.S. PATENT DOCUMENTS

2003/0233452 A1* 12/2003 Maufer ............. H04L 29/12018
709/225
2008/0183853 A1* 7/2008 Manion ............... H04L 12/4641
709/223
2012/0233668 A1* 9/2012 Leafe ................... G06F 9/5022
726/4

* cited by examiner

*Primary Examiner* — Umar Cheema
*Assistant Examiner* — Tony Williams
(74) *Attorney, Agent, or Firm* — Thorpe North & Western, LLP.

(57) ABSTRACT

A technology is described for assigning a logical private network address to a computing instance. An example method may include obtaining a preserved logical private network address associated with a customer account so that the preserved logical private network address may be assigned as a logical private network address to a computing instance located in a computing service environment. The logical private network address may be used for network communications within a physical host containing the computing instance and the logical private network address may translate to a physical private network address used for network communications outside of the physical host and within the computing service environment. A network address record for the computing instance may be identified that associates the logical private network address with the physical private network address, and the network address record may be updated by setting the preserved logical private network address associated with the customer account as the logical private network address.

20 Claims, 7 Drawing Sheets

NETWORK ADDRESS MANAGEMENT

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine (physical host) using a hypervisor. Each computing instance may be a guest machine acting as a distinct logical computing system that provides a customer with the perception that the customer is the sole operator and administrator of a given virtualized hardware computing resource.

When launching a computing instance, a public network address and a private network address may be assigned to the computing instance. The public network address may be reachable over a public network (e.g., the Internet) and may be used for network communications with computers and computing services outside of a computing service environment (e.g., a cloud environment or a virtual private environment). The private network address may be used for routing network communications between computing instances within the same private network, but the private network address may not be reachable over a public network and may not be used to communicate with computing services outside of a computing service environment. When the computing instance is stopped or terminated, the private network address may be disassociated from the computing instance. If the computing instance is restarted, a new private network address may be assigned to the restarted computing instance.

DETAILED DESCRIPTION

A technology is described for assigning a preserved logical private network address to a computing instance associated with a customer account. Illustratively, when a computing instance is launched for a customer account, a logical private network address may be assigned to the computing instance. From a customer's perspective, the logical private network address allows for network communications between the computing instance and other computing instances and computing services within a computing service environment. From a system perspective, the logical private network address may be used for communications between computing instances hosted by the same physical host and may be translated to a physical private network address that may be used for communications outside of the physical host within the computing service environment. In the event that the computing instance is stopped (e.g., shut down) or terminated, the logical private network address may be disassociated from the computing instance.

In one example configuration of the technology, after disassociating the logical private network address from a computing instance associated with a customer account, the logical private network address may be preserved for use by the customer account (as opposed to releasing the logical private network address to a general pool of addresses allocated to any customer with a new instance). For example, the logical private network address may be available to the customer account to reassign to a rebooted computing instance or to another computing instance associated with the customer account. As a result of preserving the logical private network address, a request to reassign the preserved logical private network address to a computing instance for the customer account may be fulfilled by identifying a network address record that associates a logical private network address with the computing instance and updating the network address record with the preserved logical private network address. In one example configuration, a logical private network address that may have been automatically assigned to the new or restarted computing instance may be replaced with the preserved logical private network address in the network address record.

The updated network address record may then be propagated to physical hosts that host computing instances within a computing service environment. Translation tables for an address translation service located on the physical hosts may be updated with the network address record, thereby associating the logical private network address with a physical private network address used for communications between the physical hosts. As a result of updating the translation tables with the network address record, the computing instance may be assigned the preserved logical private network address.

In the past, a computing instance for a customer account may have been assigned a private network address that was released when the computing instance was stopped or terminated. As such, the released private network address was not available to reassign to a restarted computing instance or another computing instance associated with the customer account, but would instead be assigned a new (i.e., different) private network address. Assignment of a new private network address may have resulted in having to reconfigure services included in a computing service environment to recognize the new private network address. As one example, a customer may have configured a computing instance to host a service (e.g., a DNS (Domain Name Service) or a DHCP (Dynamic Host Configuration Protocol) service) that communicated with other computing instances within the virtual private cloud using a private network address assigned to the computing instance. In the event that the computing instance was stopped or terminated, the private network address assigned to the computing instance was released and could not be retained for reassignment by the customer. As a result, the customer would have to reconfigure the service using a new private network address.

As a result of the technology disclosed herein, a logical private network address that translates to a physical private network address may be assigned to a computing instance associated with a customer account. In the event that the logical private network address and the physical private network address are disassociated from the computing instance, the logical private network address may be preserved for use by the customer account, such that the logical private network address may be reassigned to a restarted computing instance, or to another computing instance associated with the customer account and the logical private network address may translate to a physical private network address assigned to the computing instance.

Figure 1:
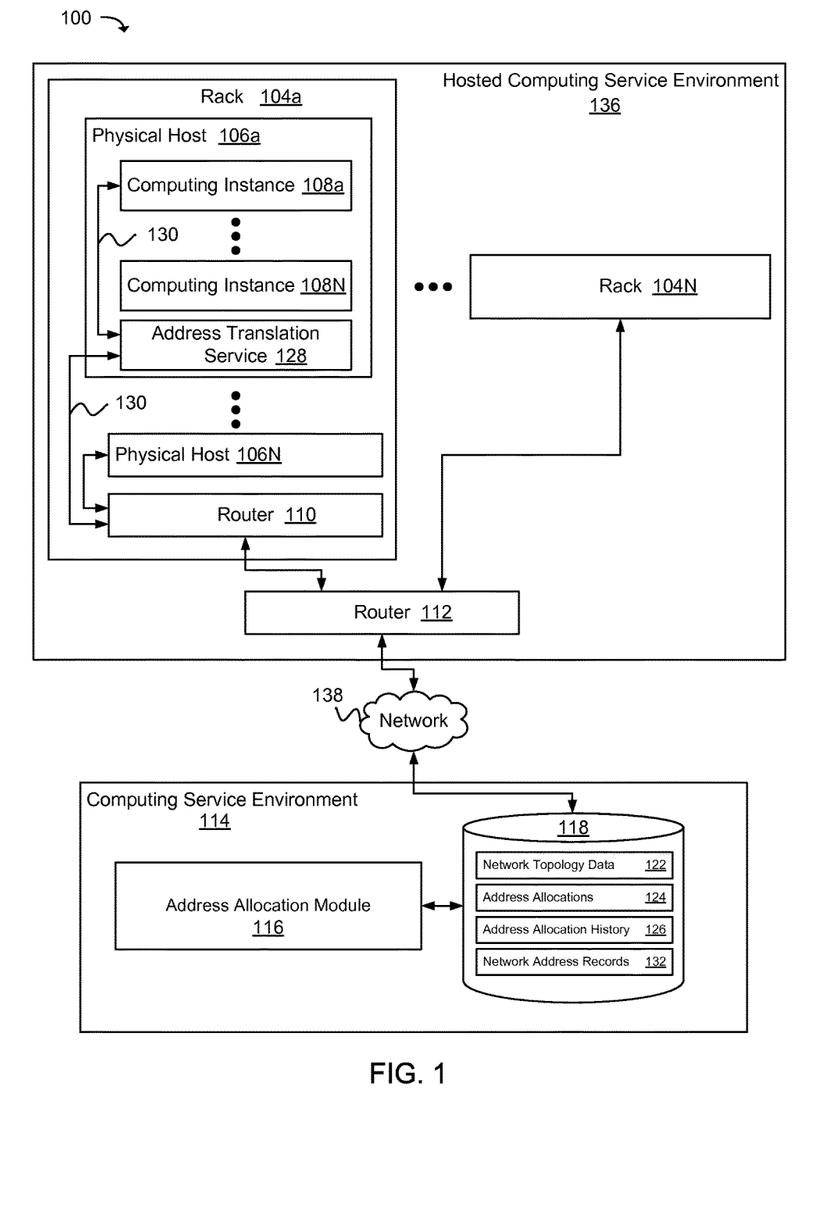
FIG. 1 is a block diagram that illustrates various example components included in a networked environment for assigning a preserved logical private network address to a computing instance associated with a customer account.

FIG. 1 illustrates components of an example networked environment 100 on which the present technology may be executed. The networked environment 100 may include a hosted computing service environment 136 and a computing service environment 114 in data communication via a network 138. The hosted computing service environment 136 may include a plurality of racks 104*a-n* that may be connected to the network 138 by way of one or more routers 112. Although described as "racks," the racks 104*a-n* may correspond to other subdivisions of a hosted computing service environment 136 (e.g., data centers, rooms within data centers, groupings of racks, groupings of computing equipment, etc.).

A rack 104*a-n* may include a number of physical hosts 106*a-n* and a router 110. The physical hosts 106*a-n* may be computing devices of different types and quantities that have a processor, memory and other hardware subsystems. A physical host 106*a-n* may host computing instances 108*a-n* of different types and quantities for one customer or multiple customers. The router 110 may correspond to a top-of-rack (TOR) router or other device that provides connectivity to the network for the respective rack 104*a*. The racks 104*a-n* and the physical hosts 106*a-n* located on the racks 104*a-n* may be allocated blocks of physical private network addresses that may be used for routing communications between computing instances 108*a-n* on the racks 104*a-n* and the physical hosts 106*a-n*. In one example configuration, an address block of physical private network addresses may be allocated to a rack 104*a-n* and physical private network addresses included in the address block may be allocated to the physical hosts 106*a-n* located on the rack 104*a-n*. The physical private network addresses may identify physical hosts 106*a-n* located on a rack 104*a-n* and may be used to route network traffic within a hosted computing service environment 136 to the physical hosts 106*a-n* and the computing instances 108*a-n* hosted by the physical hosts 106*a-n*.

Illustratively, at the time that a physical host 106*a-n* is configured to host computing instances 108*a-n*, physical private network addresses may be statically allocated to the physical host 106*a-n*, which may then manage the physical private network addresses assigned to the computing instances 108*a-n*. In as much, a rack 104*a-n* may be advertised as being responsible for a block of physical private network addresses allocated to the rack 104*a-n*. Network traffic intended for a specific computing instance 108*a-n* located within the rack 104*a-n* may be routed to the rack 104*a-n* and then routed to a physical host 106*a-n* that hosts the destination computing instance 108*a-n*. Because physical private network addresses may be statically assigned to racks 104*a-n* and physical hosts 106*a-n*, dynamically updating assignments of physical private network addresses may be difficult.

For example, a physical private network address may be assigned to a customer's computing instance 108*a-n*. In the case that the customer's computing instance 108*a-n* is stopped or terminated, the computing slot may become available to host another customer's computing instance 108*a-n*. As such, if the customer restarts the computing instance 108*a-n*, the computing instance 108*a-n* would most likely be placed on a different computing slot and therefore, would be assigned a physical private network address that is statically allocated to a physical host 106*a-n* containing the computing slot.

The present technology may enable the release of a physical private network address from a computing instance 108*a-n* associated with a customer account when the computing instance is stopped or terminated, and may also enable the option to reassign the physical private network address to a restarted computing instance 108*a-n* or another computing instance 108*a-n* associated with the customer account. In particular, a logical private network address may be assigned to a customer's computing instance 108*a-n* that translates to a physical private network address allocated to the physical host 106*a-n* that executes the computing instance 108*a-n*. A logical private network address assigned to a computing instance 108*a-n* can be preserved for a customer account in the event that the computing instance 108*a-n* is disassociated from the logical private network address (e.g., the computing instance 108*a-n* is stopped or terminated). Preservation of the logical private network address enables reassignment of the logical private network address to a computing instance associated with the customer account.

As illustrated, a physical host 106*a-n* may include an address translation service 128 that may be configured to translate logical private network addresses and physical private network addresses via translation tables. For example, using a translation table, a logical private network address may be translated to a physical private network address when communications from a computing instance 108*a-n* are sent to a destination outside of a physical host 106*a-n* that hosts the computing instance 108*a-n*, and a physical private network address may be translated to a logical private network address for communications sent to the computing instance 108*a-n*.

For example, in launching a computing instance 108*a-n* on a physical host 106*a-n*, an available logical private network address included in a pool of logical private network addresses may be assigned to the computing instance 108*a-n*. The logical private network address may be exposed to a customer so that the customer may configure services within the customer's virtual private cloud to reference the logical private network address. The assigned logical private network address may be associated with a physical private network address that is allocated to the physical host 106*a-n* on which the computing instance 108*a-n* is executing. Associating the logical private network address and the physical private network address may be accomplished using a translation table. For example, the translation table may include a record associating the logical private network address with the physical private network address.

As a specific example, a network communication 130 sent by a computing instance 108*a* to a destination host (e.g., a physical host 106*n* or a rack 104*n*) may first be handled by the address translation service 128 that translates the logical private network address for the computing instance 108*a* to a physical private network address for the computing instance 108*a* using the translation table, and forwards the network communication to a destination host using the physical private network address. Likewise, a network communication sent to the computing instance 108*a* from a source host (e.g., a physical host 106*n* or a rack 104*n*) addressed using the physical private network address of the computing instance 108*a* may arrive at the physical host 106*a*, where the address translation service 128 may handle the network communication by translating the physical private network address to the logical private network address and forwards the network communication to the computing instance 108*a*.

The computing service environment 114 may include an address allocation module 116 and a data store 118 that stores network topology data 122, address allocations 124, address allocation history 126 and network address records 132. The network topology data 122 may include information regarding the physical and logical network topology of the hosted computing service environment 136. Such information may include data regarding racks 104*a-n* or other network subdivisions, physical hosts 106*a-n* in the racks 104*a-n*, routers 110 and 112, and so on. The address allocations 124 may describe the blocks of physical private network addresses that are currently assigned to be managed by racks 104*a-n*, routers 110 and 112, physical hosts 106*a-n*, and/or other components of the hosted computing service environment 136. Also, the address allocations 124 may describe allocations of logical private network addresses to the computing instances 108*a-n*.

The address allocation history 126 may provide a history of logical private network address allocations that have been made to particular computing instances 108*a-n* located in the hosted computing service environment 136. Accordingly, the address allocation history 126 may be referenced to determine which logical private network addresses have been assigned to a customer's computing instances 108*a-n* in the past. Those logical private network addresses that have been assigned to a customer's computing instances 108*a-n* may be preserved so that the customer can reassign the logical private network addresses to computing instances 108*a-n* associated with the customer's account. For example, a logical private network address may be preserved for a customer account by indicating that the logical private network address is unavailable for assignment except to a computing instance 108*a-n* for the customer account (until the customer explicitly releases the logical private network address). Network address records 132 may include routing data that associates logical private network addresses with physical private network addresses. A network address record 132 may be pushed to the physical hosts 106*a-n* or pulled from the data store 118 so that translation tables used by the address translation services 128 located on the physical hosts 106*a-n* may be updated with current routing data included in the network address record 132.

A network address record 132 may be created when a computing instance 108*a-n* is placed on a physical host 106*a-n*. The network address record 132 may include a physical private network address and a logical private network address assigned to the computing instance 108*a-n*. The network address record 132 may then be provided to an address translation service 128 located on the physical hosts 106*a-n* that may update an address translation table with the network address record 132.

The network address record 132 may be updated as a result of reassigning a logical private network address to a computing instance 108*a-n*. For example, a customer request to reassign a preserved logical private network address to a computing instance 108*a-n* may be fulfilled by updating a network address record 132 for the computing instance 108*a-n* by replacing the logical private network address in the network address record 132 with the preserved logical private network address, as will be described in greater detail in relation to FIG. 3.

The address allocation module 116 may be configured to assign network addresses to computing instances 108*a-n* hosted within the hosted computing service environment 136. As a non-limiting example, network address allocations may be made to a computing instance 108*a-n* when the computing instance 108*a*—N is instantiated. The computing instance 108*a-n* may be assigned a public network address for network communications over public networks (e.g., the Internet), as well as a physical private network address and a logical private network address for communications within the hosted computing service environment 136. The assignment of the public network address and the physical private network address may be assigned based on a physical host 106*a-n* that the computing instance 108*a-n* is placed. For example, the address allocation module 116 may reference the network topology data 122 to determine which public network address and physical private network address is associated with the physical host 106*a-n* and assign the computing instance 108*a-n* the public network address and physical private network address associated with the physical host 106*a-n*.

In one example, assignment of the logical private network address to the computing instance 108*a-n* may be performed by identifying a physical host 106*a-n* selected to host the computing instance 108*a-n* and referencing address allocations 124 managed by the physical host 106*a-n* to identify an available logical private network address. The available logical private network address may then be assigned to the computing instance 108*a-n*. Illustratively, logical private network addresses utilized by a physical host 106*a-n* may have an addressing space (e.g., a prefix) that may be different from an addressing space (e.g., prefix) of physical private network addresses. As a non-limiting example, a prefix of logical private network addresses may be "10.0.0.1" and a prefix of physical private network addresses may be "128.0.0.1". As such, logical private network address allocations within a particular physical host 106*a-n* may be internal to the physical host 106*a-n*, and therefore may not conflict with logical private network address allocations within other physical hosts 106*a-n*. Other methods for allocating logical private network addresses are within the scope of this disclosure. For example, blocks of logical private network addresses in one address space may be divided and assigned across the physical hosts 106*a-n*, and then computing instances 108*a-n* hosted on by the physical hosts 106*a-n* may be assigned a logical private network addresses included in the blocks of logical private network addresses assigned to the physical hosts 106*a-n*.

The hosted computing service environment 136 may have multiple routers 110, 112 servicing different racks 104*a-n* or subdivisions of the network 138. The routers 110 and 112 may employ a routing protocol such as routing information protocol (RIP), open shortest path first (OSPF) or other routing protocols. The routers 110 and 112 may in some cases be constrained by the number of separate physical private network address allocations that can be advertised, thereby making dynamic allocations of physical private network addresses impracticable.

The various processes and/or other functionality contained within the networked environment 100 may be executed on one or more processors that are in communication with one or more memory modules. The physical hosts 106*a-n* in the networked environment 100 may comprise computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 138 may include any useful computing network, including an intranet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 1 illustrates that certain modules may be discussed in connection with this technology. Such modules may be centrally hosted functionality or a service application that may receive requests and provide output to other modules or consumer devices. For example, modules may be considered on-demand computing that are hosted in a server, virtualized service environment, grid or cluster computing system. An API may be provided for each module to enable a second module or service to send requests to and receive output from the first service. Such APIs may also allow third parties to interface with the modules and make requests and receive output from the modules. While FIG. 1 illustrates an example of a system that may implement the techniques above, many other similar or different environments are possible. The example environments discussed and illustrated above are merely representative and not limiting.

Figure 2:
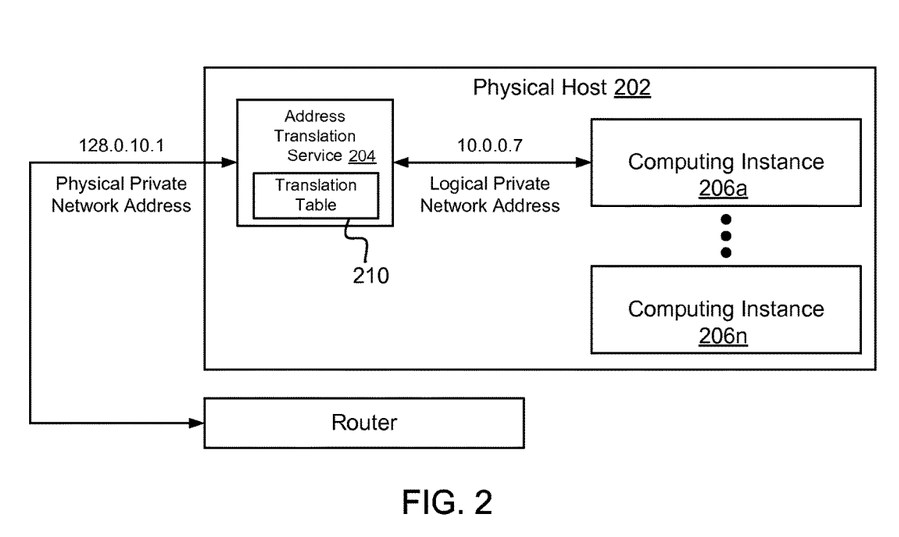
FIG. 2 is a block diagram that illustrates an example address translation service that translates physical private network addresses and logical private network addresses used for routing network traffic within a hosted computing environment.

FIG. 2 is a block diagram that illustrates an example address translation service 204 that may be utilized within a physical host 202*a-n*. The address translation service 204 may be configured to translate physical private network addresses and logical private network addresses used for routing network traffic within a computing service environment. As illustrated, a logical private network address may be assigned to a computing instance 206 *a-n*. The logical private network address may identify a computing instance 206 *a-n* within a physical host 202. Accordingly, network communications between computing instances 206 *a-n* within the physical host 202 may be routed using the logical private network address. Network communications between computing instances 206 *a-n* and destinations outside of the physical host 202 may be routed by translating the logical private network address to a corresponding physical private network address, and translating a physical private network address to a corresponding logical private network address. A translation table 210 may be referenced by the address translation service 204 to translate a physical private or logical private network address. Illustratively, IP (Internet Protocol) version 4, IP version 6 or another network protocol may be used to implement the present technology.

Figure 3:
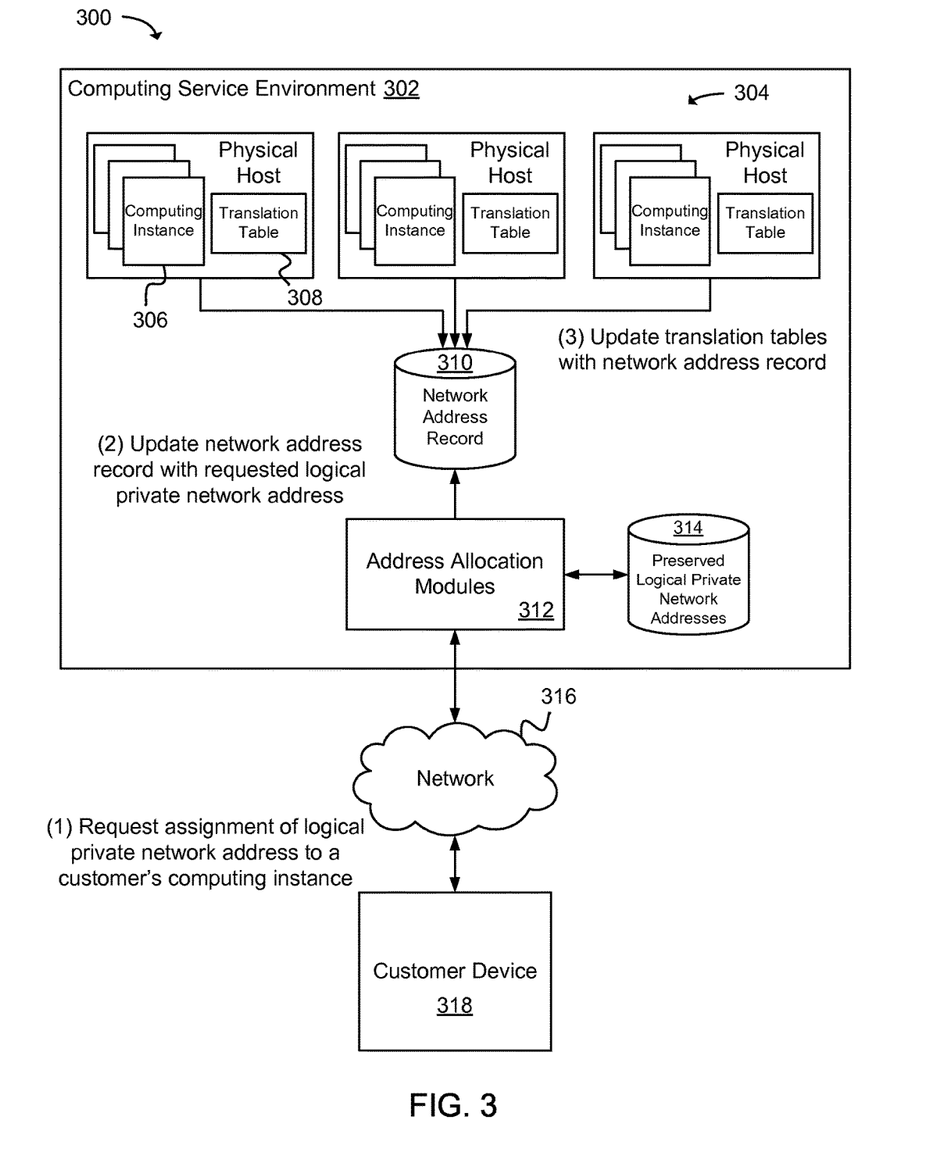
FIG. 3 is a block diagram that illustrates an example system and method for assigning a preserved logical private network address associated with a customer account to a computing instance associated with the customer account.

FIG. 3 is a block diagram illustrating a high level example of a system 300 and method for assigning a preserved logical private network address associated with a customer account to a computing instance 306 associated with the customer account. As illustrated, the system 300 may include a computing service environment 302 that includes a plurality of physical hosts 304 that execute computing instances 306 and an address allocation module 312, as well as other modules and services that may be included in the computing service environment 302.

As described earlier, a computing instance 306 associated with a customer account may be assigned a logical private network address and a physical private network address when the computing instance 306 is placed on a physical host 304. The logical private network address may be used to route network traffic between computing instances and services located within a physical host 304, and the physical private network address may be used for routing the network traffic outside of the physical host 304 and within the computing service environment 302. A logical private network address and a physical private network address assigned to a computing instance 306 may be translated by way of a translation table 308 located on a physical host 304 that hosts the computing instance 306.

In the event that the computing instance 306 is stopped or terminated, the logical private network address assigned to the computing instance 306 may be preserved for reuse by the customer account. For example, the logical private network address may be flagged as a preserved logical private network address 314 for the customer account, thereby making the logical private network address unavailable for reassignment to a computing instance 306 that is not associated with the customer account. The physical private network address assigned to the stopped or terminated computing instance 306 may be statically assigned to a physical host 304 on which the computing instance 306 was executing. Therefore, the physical private network address may not be preserved for the customer account since a computing slot on the physical host 304 that hosted the computing instance 306 may be made available to execute other computing instances 306 for other customer accounts.

Should a request associated with the customer account be made to restart the computing instance 306 (e.g., launch a new computing instance modeled on a stopped computing instance and restoring any data used by the terminated computing instance), or to launch a new computing instance 306, a preserved logical private network address 314 associated with the customer account may be reassigned to the restarted or new computing instance. As one example, a request to update a logical private network address assigned to the restarted or new computing instance 306 with a preserved logical private network address may be received by the address allocation module 312. Illustratively, when a customer makes a request to restart or launch a computing instance 306, the customer may be provided with one or more preserved logical private network addresses 314 associated with the customer's account. The customer may specify that a preserved logical private network address be assigned to the restarted or new computing instance 306 as the logical private network address.

After receiving the request to assign the preserved logical private network address 314 as the logical private network address, the address allocation module 312 may be configured to identify a network address record that associates a logical private network address with a physical private network address for the restarted or new computing instance 306. For example, the network address record may be a data record that includes a physical private network address/logical private network address pair.

Having identified the network address record, the network address record may be updated with the preserved logical private network address 314. In one example configuration, upon launching a computing instance 306 on a physical host 304, a logical private network address from a logical private network address pool may be automatically assigned to the computing instance 306. Therefore, a request to assign a preserved logical private network address 314 as the logical private network address may be performed by replacing the logical private network address in the network address record with the preserved logical private network address associated with the customer account. In another example configuration, prior to launching a computing instance 306 in response to a launch request that includes an assignment of a preserved logical private network address 314 as the logical private network address, the preserved logical private network address 314 may be assigned as the logical private network address in a network address record for the computing instance 306.

In one example configuration, the updated network address record may be saved to a data store 310 that may be accessible to the physical hosts 304 included in the computing service environment 302. Illustratively, address translation services executing on the physical hosts 304 may be configured to retrieve the network address record from the data store 310 and update translation tables 308 located on the physical hosts 304. As a result, the preserved logical private network address (i.e., the logical private network address) may be associated with a physical private network address assigned to the computing instance 306. In an alternative example configuration, the updated network address record may be pushed to the physical hosts 304 and the translation tables 308 may be updated with the network address record.

As one non-limiting example of how the technology may be used, a customer may request via a customer device 318 that a computing instance 306 be stopped. As a result, the computing instance 306 may be shut down and the computing instance 306 stops executing. Any data used by the computing instance 306 may be saved for use when the computing instance 306 is restarted. The public network address and the physical private network address assigned to the computing instance 306 may be released. The logical private network address assigned to the computing instance 306 may be preserved by marking the logical private network address as unavailable in a logical private network address pool. For example, the logical private network address may be flagged as being associated with the customer's account, thereby preserving the logical private network address for use by the customer.

When a request to restart the computing instance 306 is received, the computing instance 306 may be placed on a computing slot on a physical host 304 and, in one example, a new public, physical private and logical private network address may be assigned to the computing instance 306. The customer may then request that the logical private network address assigned to the restarted computing instance 306 be replaced with the preserved logical private network address. The request may be handled by the address allocation module 312, which may identify a network address record associated with the restarted computing instance 306 and update the network address record with the preserved logical private network address (i.e., the logical private network address in the network address record may be replaced with the preserved logical private network address). The network address record may then be saved to a data store 310, from which software agents executing on the physical hosts 304 may retrieve the network address record and update translation tables 308 used to route network traffic with the network address record.

In some examples, a preserved logical private network address may be flagged as being associated with a stopped computing instance 306. Consequently, the preserved logical private network address may be reassigned to the computing instance 306 when the computing instance 306 is restarted without customer involvement. Namely, rather than assigning a new logical private network address to the computing instance 306, the flagged logical private network address may be identified and reassigned to the restarted computing instance 306.

As another non-limiting example of how the technology may be used, a customer may terminate a computing instance 306, whereupon the public and physical private network addresses may be released. The logical private network address assigned to the terminated computing instance 306 may be preserved by flagging the logical private network address as being associated with the customer's account. In the event that the customer launches a new computing instance 306, the customer may request that the preserved logical private network address be reassigned to the new computing instance 306. For example, logical private network addresses preserved for a customer account may be displayed in a user interface that may be accessed via an API (Application Programming Interface). The user interface may enable a customer to view logical private network addresses preserved for the customer account and request that a preserved logical private network address be assigned to the customer's computing instance 306.

As yet another non-limiting example of how the technology may be used, a logical private network address may be preserved when migrating a computing instance 306 for a first physical host 304 to a second physical host 304. For example, when migrating a computing instance 306, the computing instance 306 may be stopped on a first physical host 304 and restarted on a second physical host 304. As part of the migration process, a logical private network address assigned to the computing instance 306 being migrated may be preserved and reassigned to the computing instance 306 when the computing instance 306 is restarted on the second physical host 304.

FIG. 3 illustrates that a customer may use a customer device 318 to make requests that are received by modules in the computing service environment 302. A customer device 318 may include any device capable of sending and receiving data over a network 316. A customer device 318 may comprise, for example a processor-based system such as a computing device. A customer device 318 may be a device such as, but not limited to, a desktop computer, laptop or notebook computer, tablet computer, mainframe computer system, handheld computer, workstation, network computer, or other devices with like capability.

Figure 4:
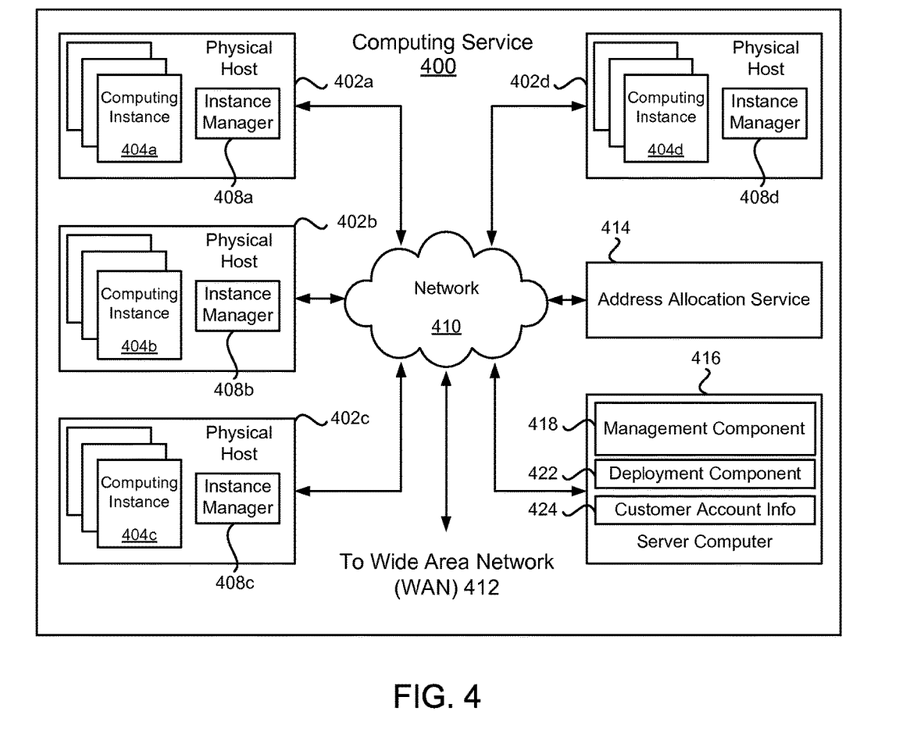
FIG. 4 is a block diagram that illustrates an example computing service environment that includes an address allocation module used to assign network addresses to computing instances.

FIG. 4 is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer an "internal cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of physical hosts 402a-d. While four physical hosts are shown, any number may be used, and large data centers may include thousands of physical hosts. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the physical hosts 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more physical hosts 414 and 416 may be reserved to execute software components for managing the operation of the computing service 400 and the computing instances 404a-d. For example, a physical host 414 may execute an address allocation module that may perform the functions described earlier, such as assigning a preserved logical private network address for a customer account to a computing instance 404a-d associated with the customer account as a logical private network address.

A physical host 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the physical hosts 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
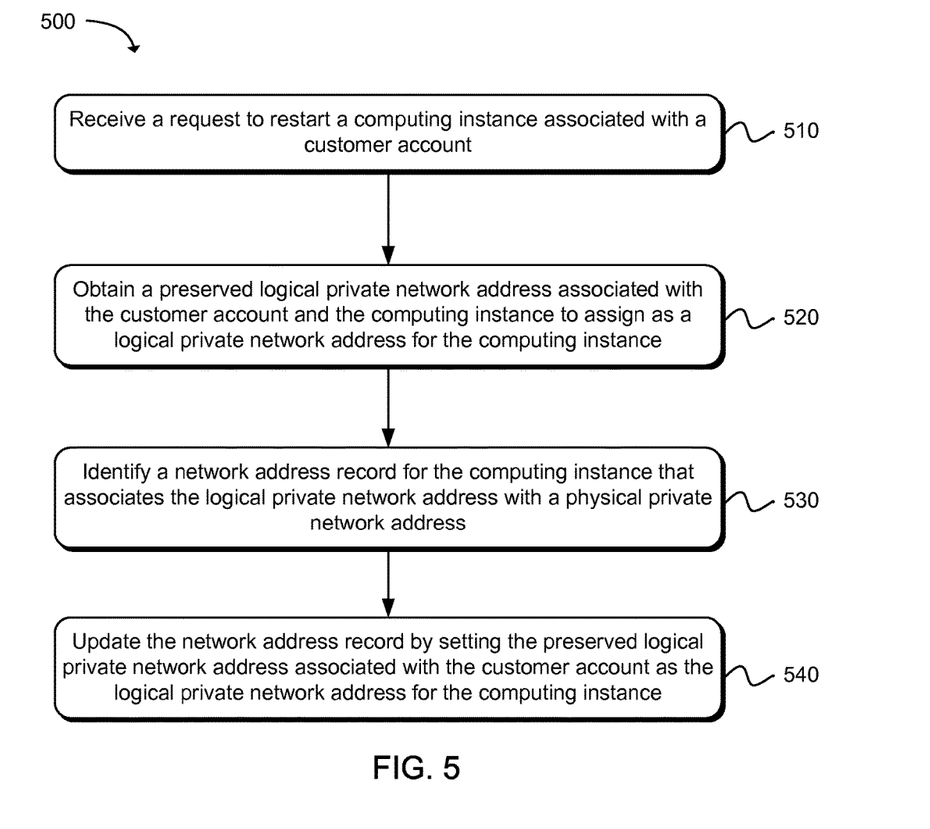
FIG. 5 is a flow diagram that illustrates an example method for reassigning a logical private network address to a computing instance as a result of a request to restart the computing instance.

Moving now to FIG. 5, a flow diagram illustrates an example method 500 for reassigning a logical private network address to a computing instance as a result of a request to restart the computing instance. For example, a logical private network address assigned to the computing instance may have been preserved for the computing instance as a result of shutting down the computing instance in response to a request to stop the computing instance. In the event that a request is received to restart the computing instance, the example method 500 may be used to reassign the logical private network address to the restarted computing instance.

Beginning in block 510, a request to restart a computing instance associated with a customer account may be received. Referencing FIG. 1, a network address allocation request may be made to the address allocation module 116 shown in FIG. 1. Returning to FIG. 5, as a result of receiving the request, as in block 520, a preserved logical private network address associated with the customer account and the computing instance may be obtained so that the preserved logical private network address may be assigned as a logical private network address to the computing instance. Illustratively, the preserved logical private network address may be flagged as being associated with the stopped computing instance, thereby making the preserved logical private network address unavailable for assignment to any computing instance other than the stopped computing instance. As such, a query may be performed that identifies the preserved logical private network address by way of the flag and returns the preserved logical private network address in response to the query.

Having obtained the preserved logical private network address, as in block 530, a network address record may be identified for the computing instance where the network address record associates the logical private network address with the physical private network address. For example, a computing slot on a physical host may be identified to place the computing instance. After identifying the computing slot, a network address record associated with the physical host that contains the computing slot may be identified. The network address record may specify a physical private network address that may be statically assigned to the physical host and may include an empty field that may be populated with a logical private network address assigned to the computing instance. The network address record may associate the physical private network address with the logical private network address, such that a translation may be performed between the physical private and logical private network addresses.

As in block 540, the network address record may be updated by setting the preserved logical private network address associated with the customer account as the logical private network address in the network address record. For example, the empty logical private network address field in the network address record may be populated with the preserved logical private network address. In one example, the network address record may then be saved to a data store that may be accessible to the physical hosts included in the computing service environment. Physical hosts and other network components included in a computing service environment may pull the network address record from the data store and update network address translation tables stored on the physical hosts with the network address record. Alternatively, the network address record may be pushed to the physical hosts and other network components in the computing service environment and network address translation tables stored on the physical hosts and other components may be updated with the network address record.

Figure 6:
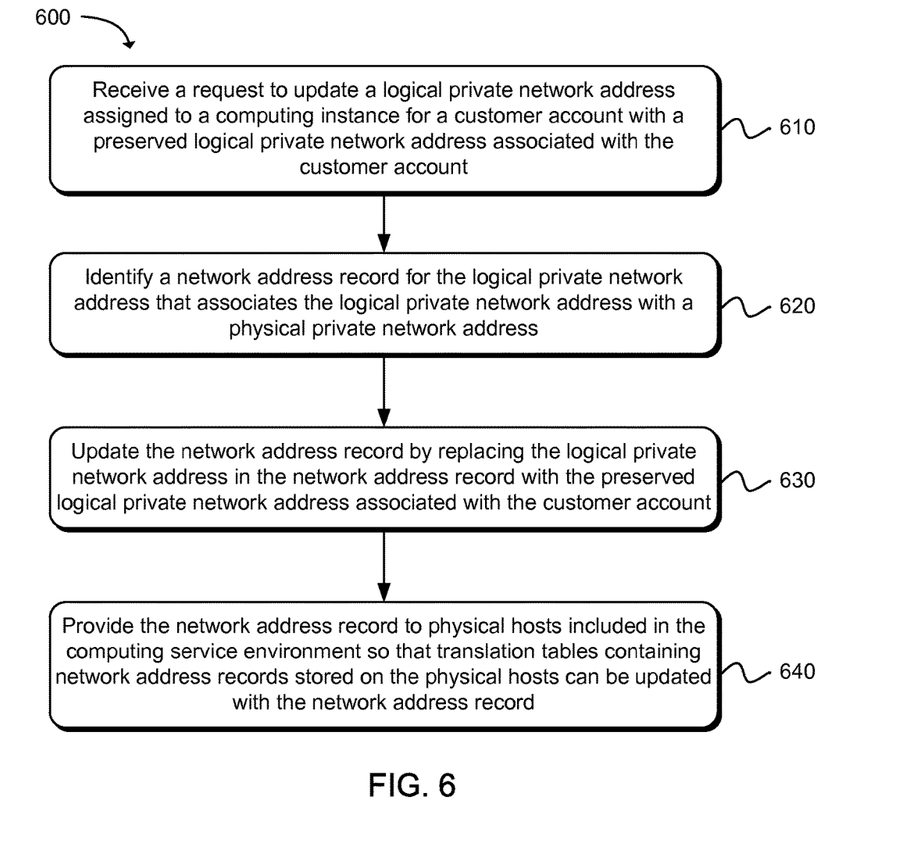
FIG. 6 is a block diagram illustrating an example method for updating an assigned logical private network address with a preserved logical private network address.

FIG. 6 is a flow diagram illustrating an example method 600 for updating an assigned logical private network address with a preserved logical private network address. For example, a logical private network address assigned to a computing instance associated with a customer account may be preserved as a result of shutting down the computing instance or terminating the computing instance. The logical private network address may be preserved for the customer account so that the logical private network address may be reassigned to a rebooted computing instance or another computing instance associated with the customer account. As an illustration, a service in a customer's virtual private cloud may be configured to execute on a redundant pair of computing instances (e.g., a primary computing instance and a secondary computing instance). In the event that the primary computing instance is terminated, the logical private network address assigned to the primary computing instance may be preserved and reassigned to the secondary computing instance.

Starting in block 610, a request may be received to update a logical private network address assigned to a computing instance for a customer account with a preserved logical private network address associated with the customer account. The preserved logical private network address may be a logical private network address that has been disassociated from a computing instance for a customer account and preserved for use as a logical private network address for another computing instance for the customer account.

When instantiating a computing instance (e.g., launching a computing instance on a computing slot on a physical host), the computing instance may be assigned: a public network address that may be used to communicate with external networks via the Internet, a logical private network address that may be exposed to a customer associated with a customer account and may be used for network communications within the physical host, and a physical private network address that may not be exposed to the customer and may be used for network communications outside of the physical host and within the computing service environment. Therefore, a computing instance may already be assigned a logical private network address when the request to update the logical private network address assigned to the computing instance is received. As a result, as in block 620, a network address record may be identified for the computing instance, where the network address record associates a logical private network address assigned to the computing instance with a physical private network address.

Having identified the network address record, as in block 630, the network address record may be updated by replacing the logical private network address in the network address record with the preserved logical private network address associated with the customer account as described earlier. Then, as in block 640, the network address record may be provided to physical hosts included in the computing service environment so that translation tables containing network address records stored on the physical hosts may be updated with the network address record. As a result of updating the translation tables, the preserved logical private network address is now assigned to the computing instance as a logical private network address.

Figure 7:
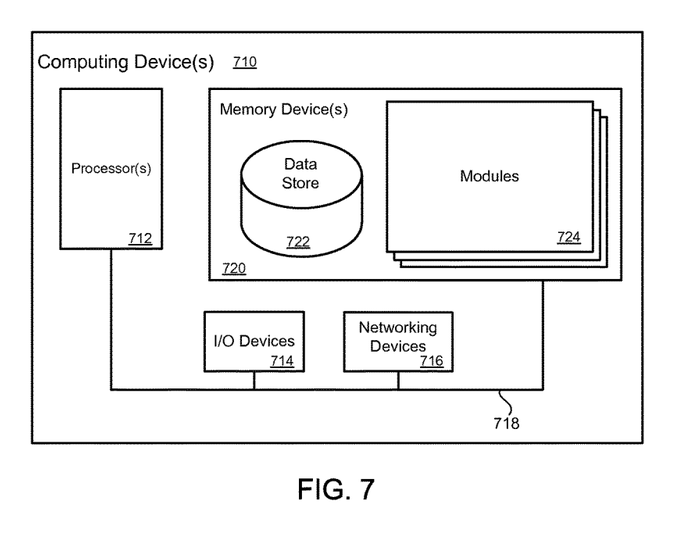
FIG. 7 is block diagram illustrating an example of a computing device that may be used to execute a method for assigning a logical private network address to a computing instance.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. For example, the memory device 720 may contain an address allocation module. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
    reserve a preserved logical private network address previously assigned to a first computing instance associated with a customer account for reassignment to a second computing instance associated with the customer account;
    receive a request to update a logical private network address assigned to the second computing instance associated with the customer account with the preserved logical private network address reserved for reassignment to the second computing instance;
    identify a network address record for the logical private network address that associates the logical private network address with a physical private network address, where the logical private network address is assigned to the second computing instance and the logical private network address translates to the physical private network address used for network communications outside of a physical host but within a computing service environment;
    update the network address record by replacing the logical private network address in the network address record with the preserved logical private network address; and
    provide the network address record to physical hosts included in the computing service environment, wherein translation tables containing network address records stored on the physical hosts are updated with the network address record, thereby associating the physical private network address with the preserved logical private network address associated with the customer account.

2. A non-transitory machine readable storage medium as in claim 1, wherein instructions that when executed by the processor further save the network address record to a data store that is accessible to the physical hosts included in the computing service environment and the physical hosts access the network address record in the data store and update the translation tables stored on the physical hosts with the network address record.

3. A non-transitory machine readable storage medium as in claim 1, wherein the preserved logical private network address is reserved as a result of the first computing instance being terminated or restarted.

4. A computer implemented method, comprising:
    reserving a preserved logical private network address that has been disassociated from a first computing instance associated with a customer account;
    obtaining the preserved logical private network address for assignment as a logical private network address to a second computing instance associated with the customer account, wherein the second computing instance is located in a computing service environment and the logical private network address is assigned to the second computing instance and the logical private network address translates to a physical private network address used for network communications outside of a physical host and within the computing service environment;
    identifying a network address record for the second computing instance that associates the logical private network address with the physical private network address, using a processor; and
    updating the network address record setting the preserved logical private network address as the logical private network address, using the processor, thereby associating the physical private network address with the preserved logical private network address.

5. A method as in claim 4, further comprising reserving the preserved logical private network address assigned to the first computing instance for the customer account as result of shutting down the first computing instance.

6. A method as in claim 4, further comprising:
    reserving the preserved logical private network address as a result of terminating the first computing instance for the customer account to which the preserved logical private network address is assigned; and
    making the preserved logical private network address available for reassignment to other computing instances for the customer account.

7. A method as in claim 4, further comprising reserving the preserved logical private network address as a result of receiving a request to migrate the first computing instance from a first physical host to a second physical host, where the preserved logical private network address is reassigned as the logical private network address for the second computing instance after migration of the first computing instance.

8. A method as in claim 4, further comprising saving the network address record that associates the physical private network address with the preserved logical private network address to a data store that is accessible to physical hosts included in the computing service environment.

9. A method as in claim 8, further comprising accessing the network address record from the data store using the physical hosts in the computing service environment and updating network address translation tables stored on the physical hosts with the network address record.

10. A method as in claim 4, further comprising pushing the network address record to physical hosts in the computing service environment and updating network address translation tables stored on the physical hosts with the network address record.

11. A method as in claim 4, further comprising instantiating the second computing instance, wherein a public network address is assigned to the second computing instance and is used to communicate with external networks via the Internet;
    the logical private network address is assigned to the second computing instance and is accessible to a customer associated with the customer account; and
    the physical private network address is assigned to the second computing instance and is used for network communications outside of the physical host and within the computing service environment.

12. A method as in claim 4, further comprising receiving a request from a customer to update the logical private network address for the second computing instance with the preserved logical private network address as a result of the second computing instance being assigned the logical private network address that translates to the physical private network address when the second computing instance was instantiated.

13. A method as in claim 12, further comprising translating between the logical private network address and the physical private network address using a NAT (Network Address Translation) service located on a physical host.

14. A method as in claim 4, further comprising providing a user interface to a customer that enables the customer to view preserved logical private network addresses for the customer account and enables the customer to select a preserved logical private network address in association with a request to replace the logical private network address with the preserved logical private network address.

15. A method as in claim 4, wherein the preserved logical private network address is preserved for use as a logical private network address for another computing instance for the customer account.

16. A method as in claim 4, wherein the preserved logical private network address is an IP (Internet Protocol) address.

17. A system comprising:
 a processor;
 a memory device including instructions that, when executed by the processor, cause the system to:
 obtain a preserved logical private network address that has been preserved for reassignment to a computing instance located in a computing service environment that is associated with a customer account in response to a request to replace a logical private network address assigned to the computing instance with the preserved logical private network address;
 identify a network address record that associates the logical private network address assigned to the computing instance with a physical private network address, where the logical private network address is assigned to the computing instance and the physical private network address is used for network communications outside of a physical host but within the computing service environment;
 update the network address record by replacing the logical private network address with the preserved logical private network address; and
 provide the network address record to physical hosts included in the computing service environment.

18. A system as in claim 17, wherein the memory device includes instructions that, when executed by the processor, causes the system to further save the network address record to a data store that is accessible to the physical hosts included in the computing service environment.

19. A system as in claim 17, wherein the memory device includes instructions that, when executed by the processor, causes the system to further retrieve the network address record from a data store down to the physical hosts and update network address translation tables stored on the physical hosts with the network address record, thereby associating the physical private network address with the preserved logical private network address.

20. A system as in claim 17, wherein the memory device includes instructions that, when executed by the processor, causes the system to provide a user interface to a customer associated with the customer account via an API (Application Programming Interface) that enables the customer to request that the logical private network address be replaced with the preserved logical private network address.

* * * * *